(12) United States Patent
Carless

(10) Patent No.: US 11,454,021 B2
(45) Date of Patent: Sep. 27, 2022

(54) LOCKING ASSEMBLY FOR SECURING ONE OR MORE BUILDING ELEMENTS IN A BUILDING SYSTEM

(71) Applicant: SYSTEMS Pty Ltd, Avalon Beach (AU)

(72) Inventor: Glenn Carless, Newport (AU)

(73) Assignee: SYSTEMS PTY LTD., Avalon Beach (AU)

( * ) Notice: Subject to any disclaimer, the term of this patent is extended or adjusted under 35 U.S.C. 154(b) by 0 days.

(21) Appl. No.: 15/733,586

(22) PCT Filed: Mar. 6, 2019

(86) PCT No.: PCT/AU2019/050190
§ 371 (c)(1),
(2) Date: Sep. 4, 2020

(87) PCT Pub. No.: WO2019/169438
PCT Pub. Date: Sep. 12, 2019

(65) Prior Publication Data
US 2021/0002888 A1    Jan. 7, 2021

(30) Foreign Application Priority Data
Mar. 6, 2018 (AU) ................................ 2018900725

(51) Int. Cl.
*E04B 1/41* (2006.01)
*E04F 13/08* (2006.01)
*E04B 1/38* (2006.01)

(52) U.S. Cl.
CPC ............ *E04B 1/40* (2013.01); *E04F 13/0803* (2013.01); *E04B 2001/405* (2013.01)

(58) Field of Classification Search
CPC ................. E04B 1/40; E04B 2001/405; E04B 2001/2445; E04B 2001/2475;
(Continued)

(56) References Cited

U.S. PATENT DOCUMENTS 2,607,971 A * 8/1952 Bedford, Jr. ........ E04F 13/0842
52/713
3,451,183 A * 6/1969 Lespagnol .............. E04C 3/065
52/656.1
(Continued)

FOREIGN PATENT DOCUMENTS

DE    1429569 A1 * 11/1968
FR    1388765 A * 2/1965
(Continued)

OTHER PUBLICATIONS

Supplementary Search Report and Written Opinion for European Application No. 19764002.2 (11 pages). (Year: 2022).*
(Continued)

*Primary Examiner* — Rodney Mintz
(74) *Attorney, Agent, or Firm* — FisherBroyles LLP; Ian R. Walsworth (57) ABSTRACT

A locking assembly (100) for securing one or more building elements in a building system is disclosed herein. The locking assembly (100) comprises: a first component (110) adapted for engagement to the building system, the first component (110) including a first locking portion (112) defining a first surface profile; a second component (120) including a second locking portion (122) defining a second surface profile corresponding to the first surface profile of the first locking portion (112), the second locking portion (122) being adapted for engagement with the first locking portion (112); and a third component (130) having a first end and a second end, the first end being adapted for engagement with the second locking portion (122) of the second component (120), wherein the third component (130) is resiliently deformable from a locked configuration to an unlocked configuration under application of force to the third component (130), wherein in the locked configuration, the second locking portion (122) is engaged to the first
(Continued)

locking portion (112) so as to secure the first component (110) to the second component (120), and in the unlocked configuration, the second locking portion (122) is disengaged from the first locking portion (112).

17 Claims, 10 Drawing Sheets

(58) Field of Classification Search
CPC ........... E04B 1/2403; E04B 2002/7462; E04B 2/7457; E04B 9/26; E04B 1/6133; E04B 1/6154; E04F 13/0803; E04F 2201/0535
See application file for complete search history.

(56) References Cited

U.S. PATENT DOCUMENTS

| | | | |
|---|---|---|---|
| 3,857,216 A | 12/1974 | Sherman | |
| 3,886,709 A * | 6/1975 | Krah | E04F 13/18 |
| | | | 52/460 |
| 4,332,119 A * | 6/1982 | Toews | E04B 2/72 |
| | | | 52/481.1 |
| 4,356,672 A * | 11/1982 | Beckman | E04B 2/7453 |
| | | | 52/238.1 |
| 4,520,607 A * | 6/1985 | Suckow | E04F 13/0812 |
| | | | 52/489.1 |
| 4,914,880 A * | 4/1990 | Albertini | E04B 2/7411 |
| | | | 52/126.4 |
| 4,974,987 A * | 12/1990 | Smock | E04B 2/744 |
| | | | 403/252 |
| 5,107,647 A * | 4/1992 | Danielewicz | E04B 1/0046 |
| | | | 52/204.597 |
| 5,657,604 A * | 8/1997 | Malott | F16B 7/0473 |
| | | | 52/655.1 |
| 6,179,511 B1 * | 1/2001 | Gassier | F16B 2/243 |
| | | | 403/322.1 |
| 8,024,901 B2 * | 9/2011 | Gosling | E04B 2/7424 |
| | | | 52/772 |
| 8,596,007 B2 | 12/2013 | Hibbs | |
| 8,925,271 B1 | 1/2015 | Bilge | |
| 9,057,190 B1 * | 6/2015 | Winter | E04B 1/2403 |
| 9,441,356 B2 * | 9/2016 | Welcel | E04B 1/24 |
| 9,828,761 B2 * | 11/2017 | Pidcock | E04B 1/6179 |
| 9,840,841 B2 * | 12/2017 | Gosling | E04C 2/46 |
| 9,874,026 B2 * | 1/2018 | Bilge | E04F 19/064 |
| RE48,722 E * | 9/2021 | Gosling | E04B 2/7424 |
| 2006/0059806 A1 * | 3/2006 | Gosling | E04B 2/7424 |
| | | | 52/238.1 |
| 2010/0307086 A1 * | 12/2010 | Hibbs | E04B 2/7457 |
| | | | 52/309.1 |
| 2011/0277417 A1 * | 11/2011 | Welcel | E04B 1/24 |
| | | | 52/653.1 |
| 2015/0152630 A1 * | 6/2015 | Winter | E04F 15/02044 |
| | | | 52/633 |
| 2016/0168863 A1 * | 6/2016 | Kwan | E04F 13/0805 |
| | | | 52/36.5 |
| 2017/0009450 A1 * | 1/2017 | Gosling | E04B 2/72 |
| 2017/0260752 A1 * | 9/2017 | Bilge | E04F 13/0891 |
| 2019/0242111 A1 * | 8/2019 | LeBlang | E04B 2/58 |
| 2021/0017771 A1 * | 1/2021 | Helms | E04F 19/06 |

FOREIGN PATENT DOCUMENTS

| | | | | |
|---|---|---|---|---|
| GB | | 952981 A * | 3/1964 | ............ E04B 9/247 |
| GB | | 985910 A * | 3/1965 | ............... E04B 9/26 |
| WO | WO-2013150219 A1 * | | 10/2013 | ........... A47B 57/545 |

OTHER PUBLICATIONS

International Search Report from parent PCT/AU2019/050190, dated Sep. 12, 2019. 7 pages.
Written Opinion from parent PCT/AU2019/050190, dated Sep. 12, 2019. 6 pages.

* cited by examiner

LOCKING ASSEMBLY FOR SECURING ONE OR MORE BUILDING ELEMENTS IN A BUILDING SYSTEM

This application is a national stage application under 35 U.S.C. 371 and claims the benefit of PCT Application No. PCT/AU2019/050190 having an international filing date of Mar. 6, 2019, which designated the United States, and which claims the benefit of Australian Provisional Patent Application No. 2018900725, filed Mar. 6, 2018, the disclosure of each of which are incorporated by reference herein.

TECHNICAL FIELD

The present invention relates to a locking assembly for securing one or more building elements in a building system.

BACKGROUND

Building systems with modular components typically utilise multiple components that are assembled together to form a frame of a building, which is then used as a human usable zone. For example, the human useable zone may be a home, house, apartment, collection of homes and/or apartments, one or more office buildings, shelter(s), office block(s), temporary building structure(s), hangar(s), storage area(s), stadiums, grandstands or other defined space in which people may utilise the space internal or external to the frame of the building for their desired needs.

In such modular building systems, the assembly of the components with one another typically requires the use of complex tools or machinery. The attachment of the components to one another also relies on the use of traditional mechanical fasteners such as nails, rivets, screws, nuts and bolts, which increase the complexity and costs associated with the assembly of the buildings system.

SUMMARY

It is an object of the present invention to substantially overcome, or at least ameliorate, one or more disadvantages of existing arrangements, or to at least provide the public with a useful choice.

According to a first aspect of the present invention, there is provided a locking assembly for securing one or more building elements in a building system, the locking assembly comprising:

a first component adapted for engagement to the building system, the first component including a first locking portion defining a first surface profile;

a second component including a second locking portion defining a second surface profile corresponding to the first surface profile of the first locking portion, the second locking portion being adapted for engagement with the first locking portion; and a third component having a first end and a second end, the first end being adapted for engagement with the second locking portion of the second component, wherein the third component is resiliently deformable from a locked configuration to an unlocked configuration under application of force to the third component, wherein in the locked configuration, the second locking portion is engaged to the first locking portion so as to secure the first component to the second component, and in the unlocked configuration, the second locking portion is disengaged from the first locking portion.

The first component may be adapted for engagement to a support structure of the building system. The support structure is preferably a building column.

The locking assembly may further include a fourth component adapted to be received in a recess of the support structure of the building system and abut the first component so as to frictionally engage and secure the first component to the support structure.

In the locked configuration, the third component may be engaged between the second component and the support structure so as to provide a watertight seal between the second component and the support structure of the building system.

The second component may be adapted for engagement with one or more building elements.

Alternatively, the first component may be adapted for engagement with one or more building elements via the second component.

In the locked configuration, the third component may be engaged between the second component and the first component so as to provide a watertight seal between the second component and the first component.

The second locking portion may be adapted for frictional engagement with the first locking portion.

The first component may include a pair of the first locking portions adapted for engagement with a respective pair of the second components.

There is also disclosed herein a building system including the locking assembly as described above, wherein the building system includes a reinforcement component adapted to be secured to the support structure of the building system for increasing the structural integrity of the building system.

There is further disclosed herein a locking system for securing a vertical support structure to a horizontal support structure of a building system, the locking system comprising:

one or more bracket members secured to the vertical support structure;

one or more collar members adapted to engage the one or more bracket members; and one or more connecting members adapted to secure the one or more bracket members and the one or more collar members to the horizontal support structure, thereby securing the vertical support structure to the horizontal support structure.

The one or more bracket members may each include a stepped profile adapted to engage a recess of the vertical support structure.

The one or more collar members may each include inner protrusions to engage the one or more bracket members.

The one or more connecting members may each be in the form of a press-fit stud or pin.

The locking system may further include a reinforcement component adapted to be received within and engage with the vertical or horizontal support structure of the building system.

The reinforcement component may be elongated and have a cross-shaped cross-section.

The locking system may further include a central component adapted to engage one or more of the reinforcement components so as to secure the vertical support structure to a further vertical support structure.

The central component may be adapted to further secure the horizontal support structure to a further horizontal support structure.

The central component may have a polyhedron shape.

The locking system may further comprise the locking assembly described above.

BRIEF DESCRIPTION OF THE DRAWINGS

Preferred embodiment of the invention will now be described, by way of example only, with reference to the accompanying drawings, in which.

DETAILED DESCRIPTION

Figure 1:
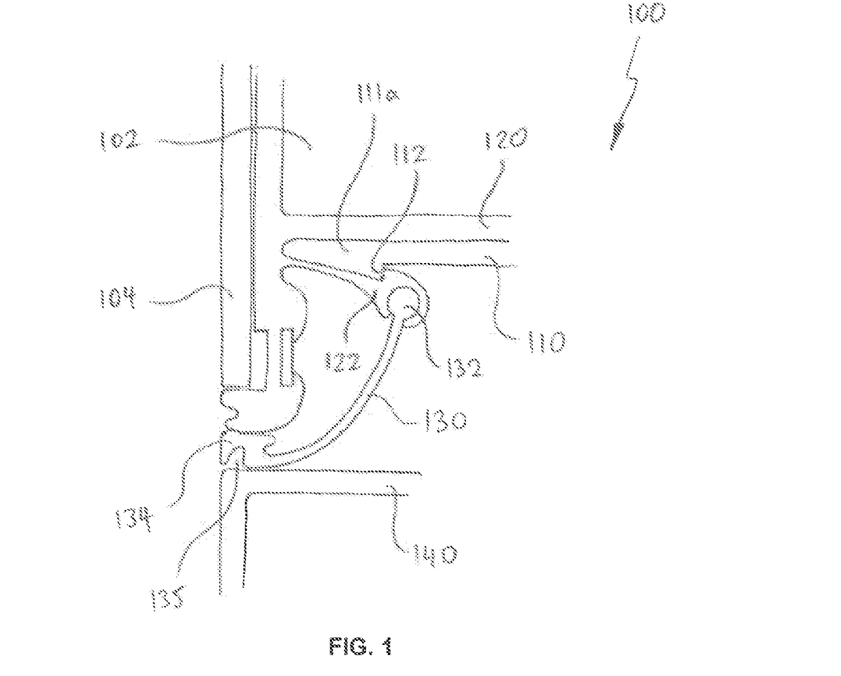
FIG. 1 is a top view of a locking assembly according to an embodiment of the present invention, showing the third component in a locked configuration.
Figure 2:
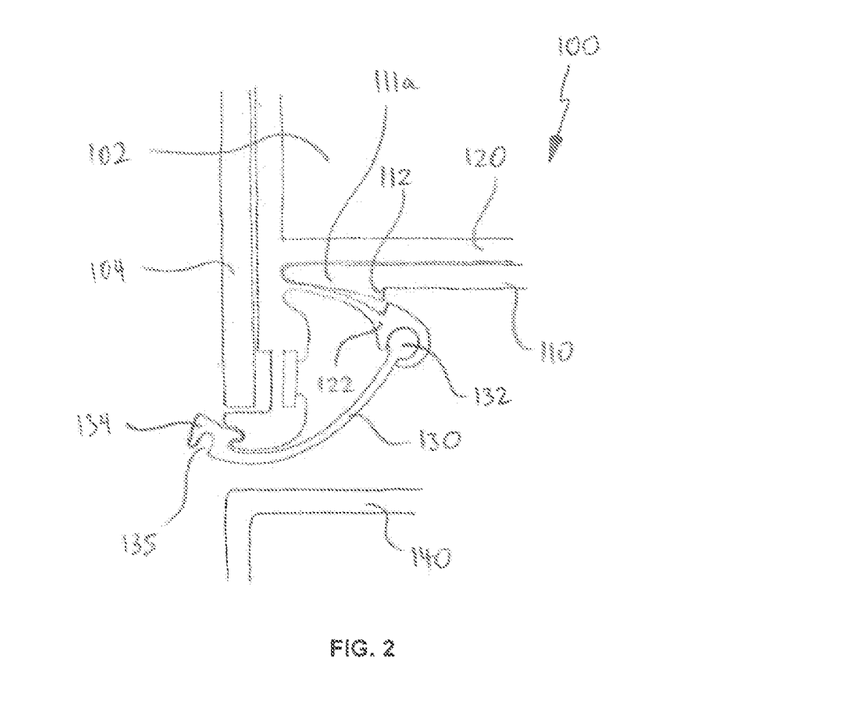
FIG. 2 is a top view of the locking assembly shown in FIG. 1, showing the third component in an unlocked configuration.
Figure 3:
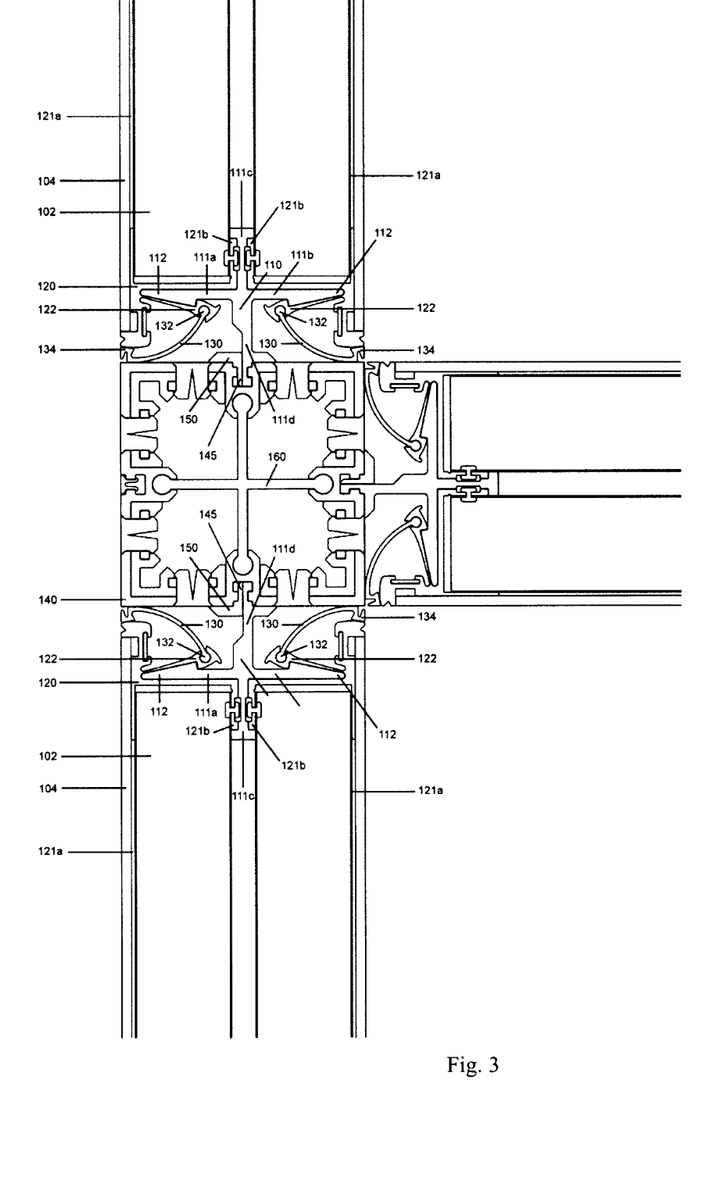
FIG. 3 is a top view of an arrangement of the locking assembly shown in FIG. 1 in conjunction with a support structure of the building system.

FIGS. 1 to 3 show a first embodiment of a locking assembly 100 for securing one or more building elements in a building system. For example, the building element may be a wall panel 102, a wall cladding or façade panel 104, a louvre system 106 or a ceiling panel 108. The locking assembly 100 includes a first component 110, a second component 120 and a third component 130. Each of the first, second and third components 110, 120 and 130 may be formed by an extrusion process of a material such as aluminium or recycled plastic.

The first component 110 is adapted for engagement to the building system, such as to a support structure 140 of the building system. The support structure 140 may be a building column (for example, as shown in FIGS. 1 to 4), a beam, a frame of the building system, or the like. In this embodiment, and as best shown in FIG. 3, the first component 110 includes four arms 111a, 111b, 111c and 111d. However, it will be appreciated that in other embodiments, the first component 110 may include three arms (e.g. as shown in component 210 in FIG. 4) or more than four arms (e.g. five arms as shown component 310 in FIG. 5), depending on the structural requirements on the building system.

At least one of the arms of the first component 110 includes a first locking portion 112 defining a first surface profile, such as a protruding section or lip. In the embodiment as shown in FIGS. 1 to 3, the first component 110 is a generally cross-shaped (i.e. cruciform) extruded component having four arms 111a, 111b, 111c and 111d, whereby the arms 111a and 111b extend away from each other in opposing directions, whilst arms 111c and 111d extend in opposing directions generally perpendicular to the arms 111a and 111b. However, it will be appreciated that in other embodiments discussed in further detail below, the first component 110 may be a generally T-shaped extruded component (for example, as shown in component 210 in FIG. 4) or a generally M-shaped extruded component (for example, as shown in component 310 in FIG. 5). It will be appreciated that each of the arms of the first component 110 (and associated surface profiles) may also be formed by an extrusion process.

Figure 4:
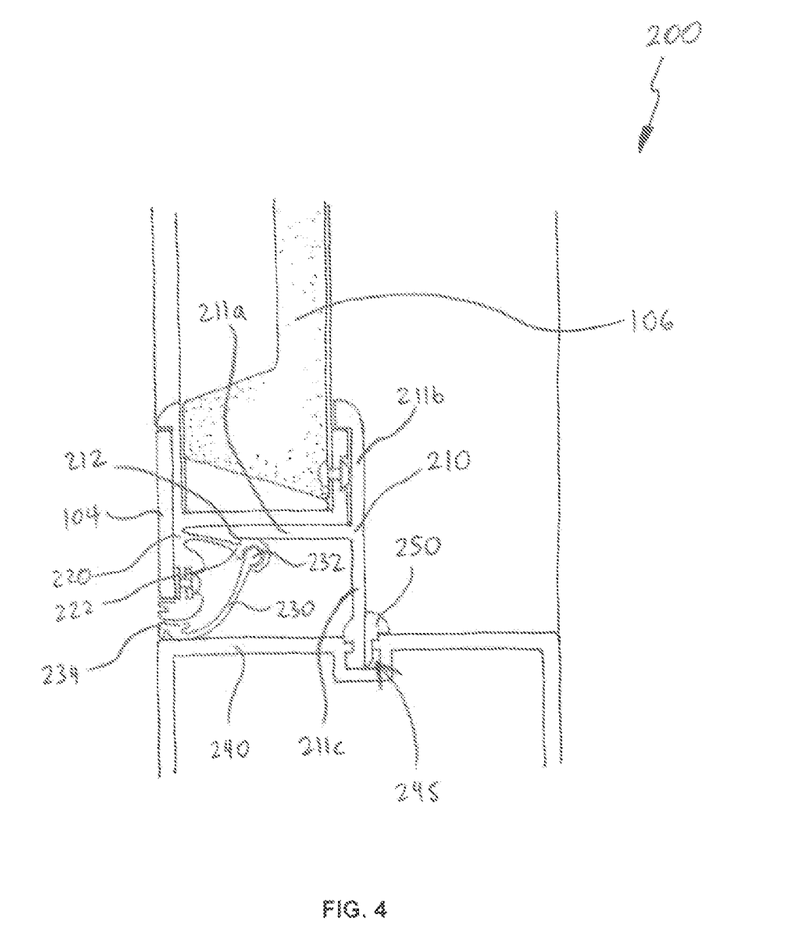
FIG. 4 is a top view of a locking assembly according to another embodiment of the present invention.
Figure 5:
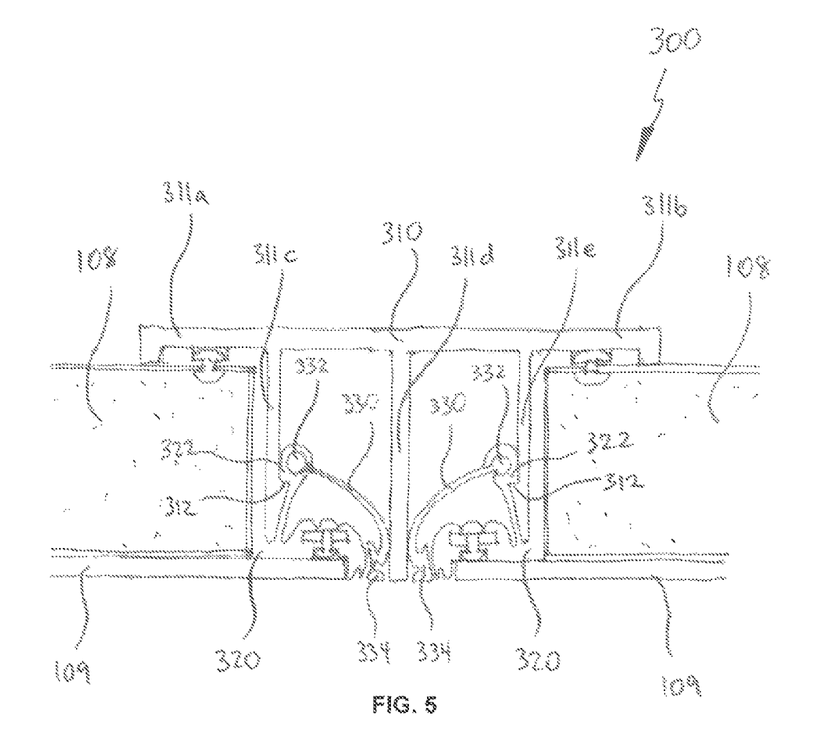
FIG. 5 is a top view of a locking assembly according to another embodiment of the present invention
Figure 6:
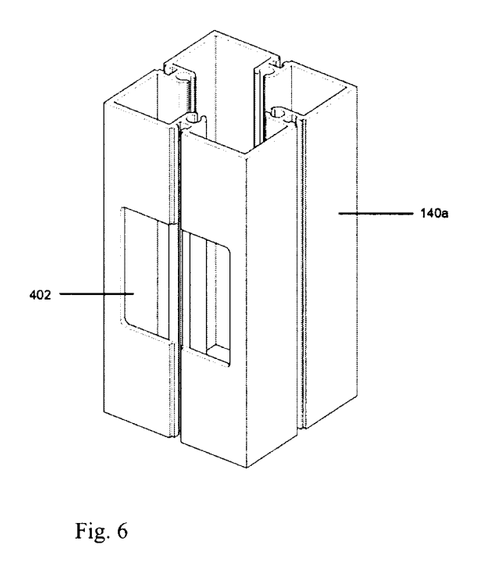
FIGS. 6 to 16 are perspective views of locking system for securing one or more support structures of a building system.

The second component 120 is adapted for engagement with one or more building elements, such as the wall panel 102 and the wall cladding 104 as shown in FIGS. 1 to 3, the louvre system 106 as shown in FIG. 4, or the ceiling panel 108 as shown in FIG. 5. In the embodiment as shown in FIG. 3, the second component 120 includes a pair of protrusions 121a, 121b which define a cavity or opening therebetween. The cavity or opening receives an end portion of the wall panel 102 and the pair of protrusions 121, 121b abut and engage two opposing surfaces of the wall panel 102. It will be understood that the cavity or opening may also receive other parts of the building system different to the wall panel 102, such as the louvre system 106 or the ceiling panel 108.

The second component 120 includes a second locking portion 122 defining a second surface profile which corresponds to the first surface profile of the first locking portion 112, such as a corresponding protruding section or lip. The second surface profile abuts and engages the first surface profile to facilitate the frictional engagement of the first locking portion 112 with the second locking portion 122. It is envisaged that the second locking portion 122 is resiliently deformable and adapted for frictional engagement to the third component 130 by way of a third surface profile. In the embodiments shown, the third surface profile is a C-shaped profile that is adapted to receive a rounded end portion of the third component 130. However, it will be appreciated that in other embodiments (not shown), the third surface profile may be any other shape that may receive and engage another component of the building system. It will also be appreciated that the second locking portion 122 (and associated surface profiles) may also be formed by an extrusion process.

The third component 130 is also resiliently deformable and includes a first end portion 132 and a second end portion 134. The first end portion 132 has a generally rounded or beaded shape which corresponds to the C-shaped third surface profile of the second locking portion 122. Accordingly, the first end portion 132 of the third component 130 is adapted for frictional engagement with the second locking portion 122 of the second component 120 by way of their corresponding surface profiles. The second end portion 134 includes a notch portion 135. It will be appreciated that in other embodiments (not shown), the first and second end portions 132 and 134 may be any other shape or geometrical form suitable for providing engagement therebetween. It will further be appreciated that the third component 130 (and associated end portions) may also be formed by an extrusion process.

As best shown in FIG. 3, the locking assembly 100 further includes a fourth component 150 that is adapted to be received in a recess 145 of the support structure 140 (e.g. a building column in FIG. 3). The fourth component 150 is adapted to abut one of the arms (e.g. the arm 111d as shown in FIG. 3) of the first component 110 so as to frictionally engage and secure the first component 110 to the support structure 140. The fourth component 150 may include a ramped portion to facilitate the insertion of the fourth component 150 into the recess 145. It will be appreciated that the fourth component 150 may be slidably inserted into the recess 145 to engage the first component 110. The fourth component 150 may also be formed by an extrusion process.

The locking assembly 100 further includes a reinforcement component 160 adapted to be secured to the support structure 140 (i.e. the column as shown in FIG. 3) of the building system to increase the structural integrity of the building system. The reinforcement component 160 may be a generally cross-shaped (i.e. cruciform) component having four arms that engage and provide support to the four corners of the column. The reinforcement component 160 may be inserted into an internal cavity of the column by sliding in vertically from the top of the column. It will be appreciated that the reinforcement component 160 may also be formed by an extrusion process.

The installation of the locking assembly 100 will now be described, again with reference to FIGS. 1 to 3.

The first component 110 is firstly attached to the support structure 140 by inserting one of the arms (e.g. arm 111*d* as shown in FIG. 3) into the recess 145 of the support structure 140. The fourth component 150 is then inserted into the recess 145, e.g. by sliding in vertically from the top of the support structure 140, such that the fourth component 150 abuts the arm 111*d* of the first component 110. The first component 110 and the fourth component 150 are thus secured in relation to one another and to the support structure 140.

The second component 120 (with the third component 130 already pre-engaged to the second locking portion 122) is then engaged to the first component 110 by way of the corresponding first and second surface profiles. As the second component 120 is resiliently deformable, the second component 120 may be inserted from the side until the first and second locking portions 112 and 122 engage each other. The second component 120 may alternatively be slid in vertically from the top against the first component 110.

With the first and second components 110 and 120 being engaged and secured in relation to one another and to the support structure 140, the third component 130 is in the locked configuration (as best shown in FIGS. 1 and 3), and the installation of the locking assembly 100 is complete. It will be understood that in the locked configuration, the third component 130 acts as a biasing mechanism, whereby the second end portion 134 is engaged between the second component 120 and the support structure 140, and this in turn causes the first end portion 132 to force the second locking portion 122 into engagement with the first locking portion 112. The second locking portion 122 may be arranged to be biased towards the first locking portion 112 when a force is not applied by the third component 130. It will also be appreciated that when the third component 130 is in the locked configuration, the third component 130 is frictionally engaged between the second component 120 and the support structure 140 and may provide a watertight seal between the second component 120 and the support structure 140.

To un-install the locking assembly 100, a force is applied to the third component 130, e.g. by inserting a slotted tool into the notch portion 135 and applying a lever force against the support structure 140. This application of force causes the second end portion 134 of the third component 130 to disengage from the second component 120 and the support structure 140. This in turn causes the second locking portion 122 of the second component 120 to disengage from the first locking portion 112 of the first component 110 due to the first end portion 132 being frictionally engaged with the second locking portion 122 of the second component 120. The third component 130 and the second component 120 are thus free to be removed from the first component 110. The fourth component 150 is then removed from the recess 145 of the support structure 140, allowing the first component 110 to also be removed.

FIG. 4 shows a variation of a locking assembly 200 which functions in a similar manner to the locking assembly 100 described above, with like reference numerals being used to indicate like features. However, in this embodiment, and as briefly described above, the first component 210 includes three arms 211*a*, 211*b* and 211*c*, such that the first component 210 is a generally T-shaped component. The second and third arms 211*b* and 211*c* extend away from each other in opposing directions, whilst the first arm 211*a* extends away from the second and third arms 211*b* and 211*c* in a direction generally perpendicular to the second and third arms 211*b* and 211*c*. The first arm 211*a* includes the first locking portion 212 which is adapted for engagement with the second locking portion 222 of the second component 220. The second arm 211*b* is adapted for engagement with the building element (e.g. the louvre system 106) via the second component 220. The third arm 211*c* is adapted for engagement with the support structure 140 via the recess 145.

FIG. 5 shows another variation of a locking assembly 300, which again functions in a similar manner to the locking assemblies 100 and 200 described above, with like reference numerals again being used to indicate like features. However, this embodiment is particularly suitable for the installation of two horizontal building elements to one another, such as ceiling panels 108 and ceiling cladding 109. In this embodiment, and as briefly described above, the first component 310 includes five arms 311*a*, 311*b*, 311*c*, 311*d* and 311*e*, such that the first component 310 is a generally M-shaped component. The first and second arms 311*a* and 311*b* extend away from each other in opposing directions. Each of the third, fourth and fifth arms 311*c*, 311*d* and 311*e* are spaced apart from each other and arranged to extend away from the first and second arms 311*a* and 311*b* in a direction generally perpendicular to the first and second arms 311*a* and 311*b*. The locking assembly 300 also includes two of the second components 320 and two of the third components 330 arranged in an opposing manner. The third and fifth arms 311*c* and 311*e* each include the first locking portion 312 which is adapted for engagement with the second locking portion 222 of the respective second component 220. The fourth arm 311*d* is adapted to be engaged between the opposing third components 330. The first and second arms 311*a* and 311*c* are each adapted for engagement with a respective one of the ceiling panels 108 via the respective second component 320. Accordingly, in this embodiment, the locking assembly 300 secures two ceiling panels so as to form a flat plane. It will be understood that this embodiment may also be useful in securing other types of horizontal or vertical building elements together, such as two of the wall panels 102 or two of the louvre systems 106 as described above.

It will be understood that the locking assemblies 100, 200 and 300 described above may be installed in a single building system, e.g. the locking assembly 100 for securing the wall panels 102 and wall cladding 104 to one side of the support structure 140, the locking assembly 200 for securing the louvre system to another side of the support structure 140, and the locking assembly 300 for installing the ceiling panels 108 and ceiling cladding 109.

Figure 7:
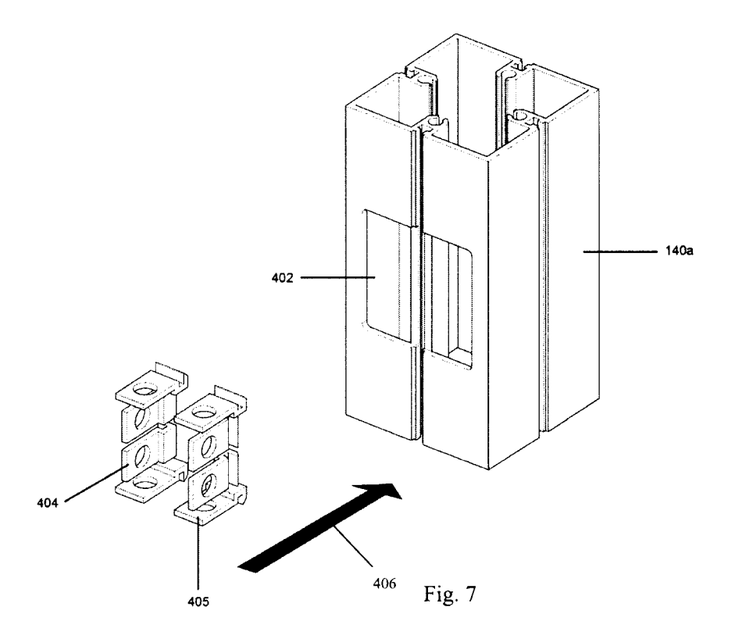
Figure 8:
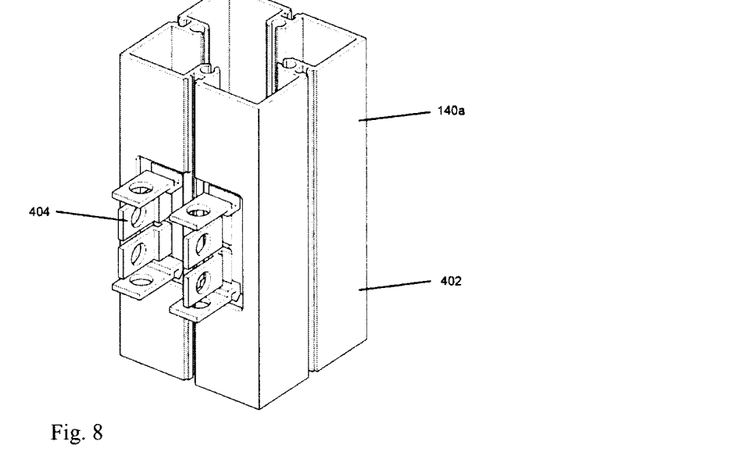

In FIGS. 6 to 16, there is depicted a locking system for securing one or more support structures 140*a*, 140*b* of the building system. In the embodiment shown, the support structure 140*a* is in the form of a building column, and the support structure 140*b* is in the form of a beam. It will be understood that the support structures 140*a* and 140*b* function in a similar manner to the support structure 140 described above. The support structure 140*a* is shown as a generally vertically-oriented building column that includes a recess 402 disposed on a side surface of the support structure 140*a*. The recess 402 is adapted to receive one or more bracket members 404 of the locking system. The bracket members 404 each include an opening 405 adapted to receive a connecting member such as a press fit stud, pin, or the like. As best shown in FIG. 7, the bracket members 404 are moved towards the recess 402 along a direction 406, which is generally transverse or perpendicular to the direction of extension of the support structure 140a, until the bracket members 404 engage the recess 402 (e.g. as best shown in FIG. 8). The bracket members 404 are then slid into a portion of the recess 402 so as to secure the bracket members 404 to the supports structure 140a. In the embodiment shown, the bracket members 404 each have a stepped profile 407 to facilitate engagement with the recess 402.

Figure 9:
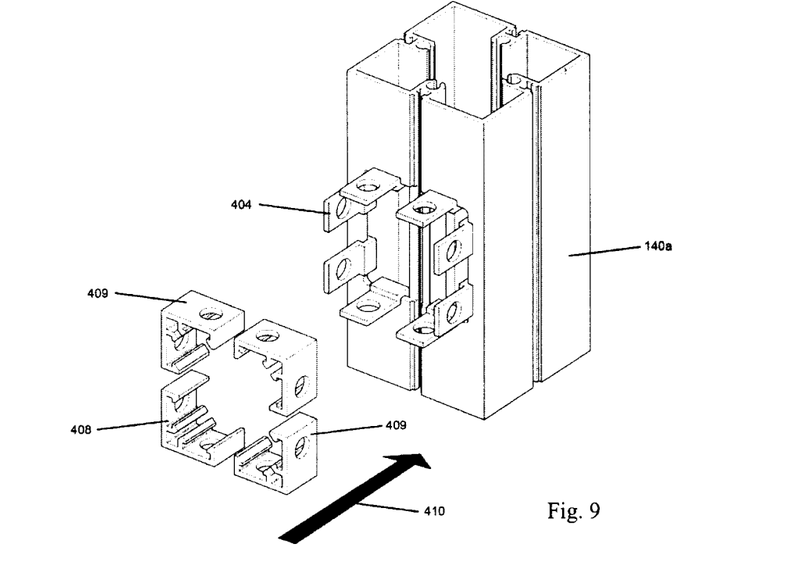
Figure 10:
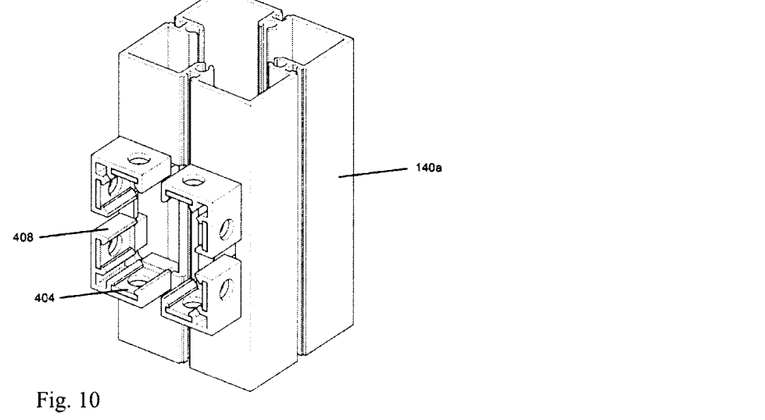

The bracket members 404 are further secured to the support structure 140a by way of one or more collar members 408 of the locking system. The collar members 408 each include one or more openings 409 adapted to receive a connecting member. It will be appreciated that the collar members 408 each include an inner surface profile (e.g. an L-shaped, U-shaped, or V-shaped cross-section with inner protrusions) that corresponds to an outer surface profile of each of the bracket members 404. As best shown in FIG. 9, the collar members 408 are adapted to be slid over the bracket members 404 along a direction 410, which is also generally transverse or perpendicular to the direction of extension of the support structure 140a, until the collar members 408 engage the bracket members 404, thereby additionally securing the bracket members 404 to the support structure 140a. In the embodiment shown, the bracket members 404 are each generally flat components with a stepped profile to engage the recess 402 of the support structure 140a, and the collar members 408 are each generally L-shaped components with inner protrusions to engage the bracket members 404. However, it will be understood that the bracket members 404 and collar members 408 may be in any other suitable geometrical form to facilitate engagement between the support structure 140a, the bracket members 404, and the collar members 408. For example, in some embodiments (not shown), the bracket members 404 and collar members 408 may be an integrally formed component that provides the connection between the support structure 140a and the support structure 140b. The arrangement of the bracket members 404 and collar members 408 also facilitate the attachment of the support structure 140b to the support structure 140a, as will be described in further detail below.

Figure 11:
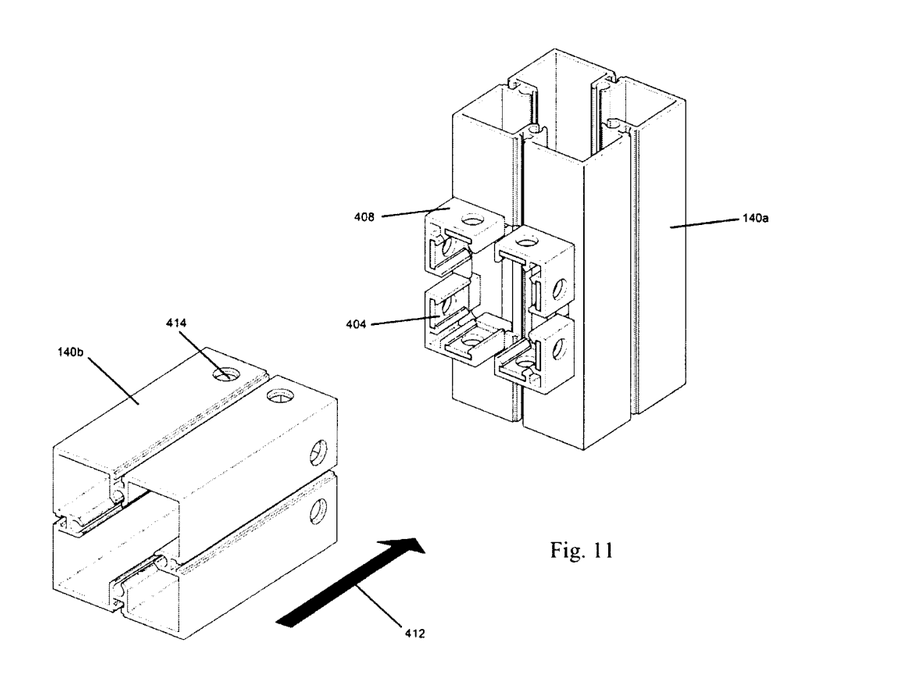
Figure 12:
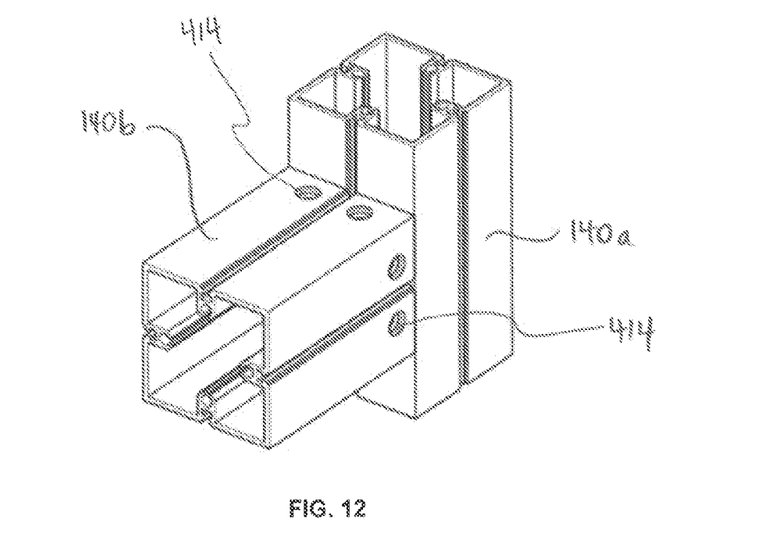
Figure 13:
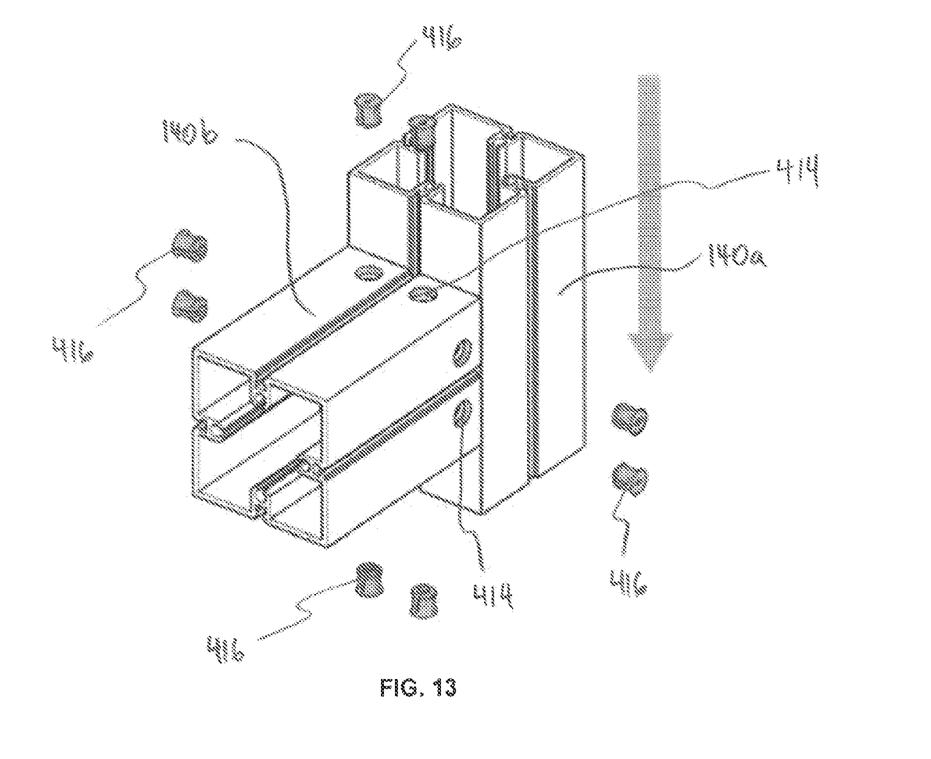
Figure 14:
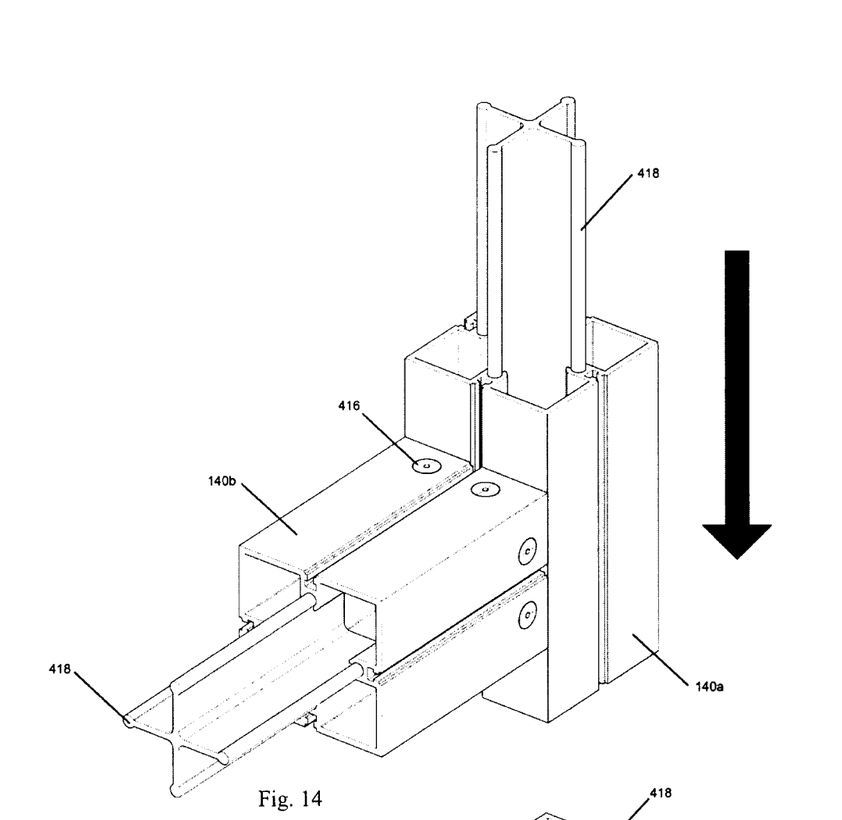

As best shown in FIG. 11, the support structure 140b (which is shown a generally horizontally-oriented beam) is moveable along direction 412, which is generally transverse or perpendicular to the direction of extension of the support structure 140a, until the support structure 140b engages the collar members 408. In the embodiment shown, inner surfaces of the support structure 140b abut and engage outer surfaces of the collar members 408. However, it will be appreciated that the support structures 140a, 140b and the collar members 408 may have any other suitable geometrical form to facilitate their engagement to one another. FIG. 12 shows the support structure 140a fully engaged with the support structure 140b, i.e., whereby an end surface of the support structure 140b is in contact with a side surface of the support structure 140a. An end portion of the support structure 140b closest to the end surface includes one or more apertures 414 each adapted to receive a connecting member 416, such as a stud or pin. The connecting member 416 is adapted to be inserted within the aperture 414. In the embodiment shown, the connecting member 416 is in the form of a press-fit stud or pin including a flared end that engages the openings 405, 409 of the respective bracket member 404 and collar member 408. However, it will be appreciated that in other embodiments (not shown), the connecting member 416 may be in any other suitable component to provide engagement between the support structure 140b, the bracket member 404 and the collar member 408. The support structure 140b is thereby secured to the bracket members 404 and the collar members 408, which are in turn secured to the support structure 140a. It will be appreciated that the bracket members 404 and collar members 408 may be formed by an extrusion process, whilst the connecting members 416 may be formed by a molding process.

Figure 15:
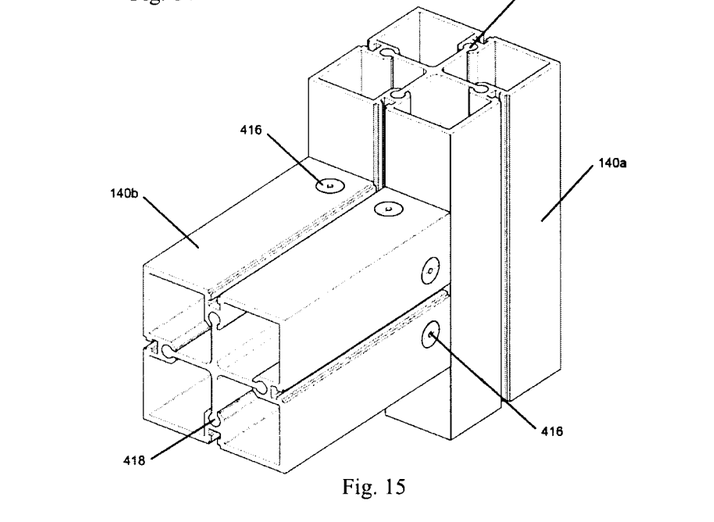
Figure 16:
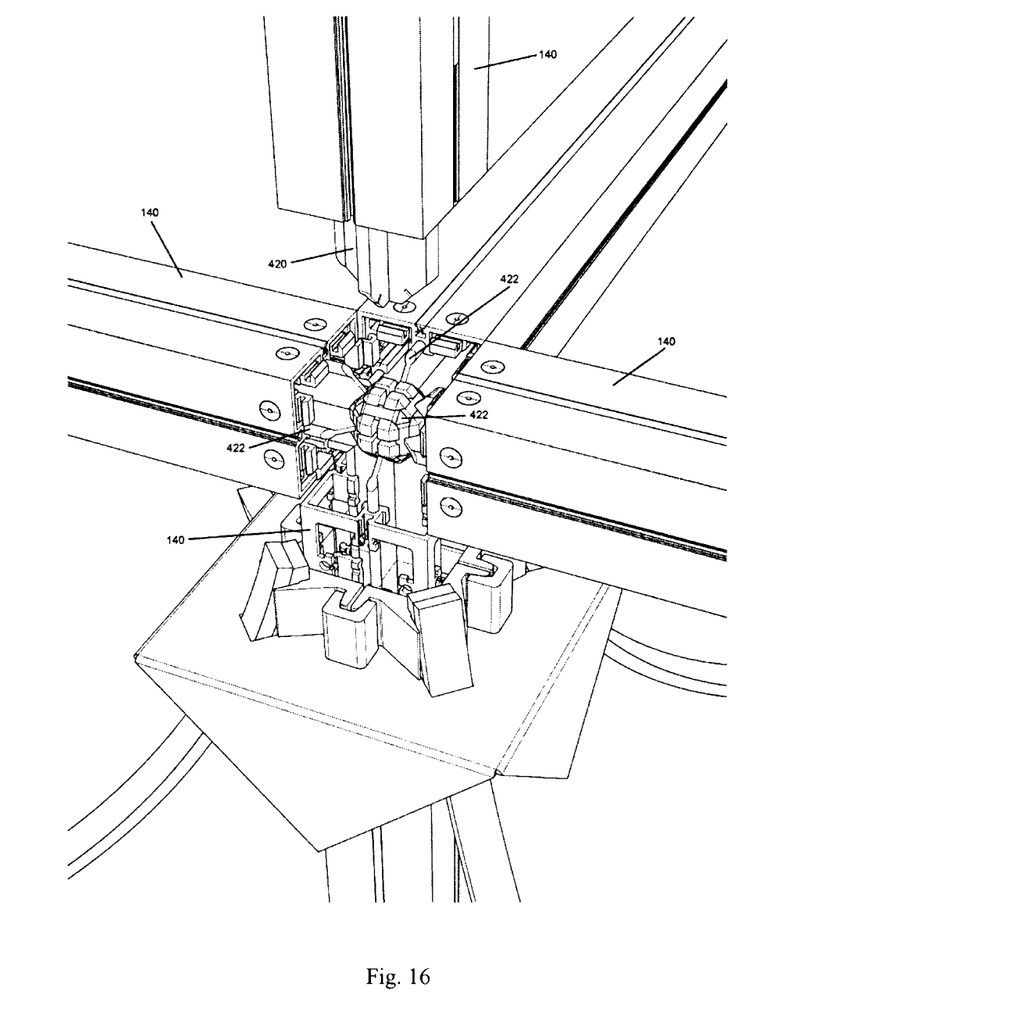

FIGS. 15 and 16 show an embodiment of reinforcement components 418 that engage the support structures 140 and 140b. The reinforcement components 418 are elongated and each have a generally cross-shaped (i.e. cruciform) cross-section and functions in a similar manner to the reinforcement component 160 described above. The reinforcement components 418 may be used as an addition to, or an alternative of, the reinforcement component 160. The reinforcement components 418 are adapted to be slidably inserted into an internal cavity of the support structures 140a, 140b to provide additional support and to increase the structural integrity of the building system without altering the external appearance of the building system. In the embodiment shown, each reinforcement member 418 includes four outwardly-extending arms that are adapted to be received within and engaged with the corresponding inwardly-extending protrusions of the support member 140a or 140b.

FIG. 16 shows an embodiment of a reinforcement component 420 (which functions in a similar manner to the reinforcement members 160 and 418 described above) having a generally pointed end adapted to be received within, and to engage, a central component 422 of the locking system. In the embodiment shown, the central component 422 has a generally polyhedron shape and is adapted to receive multiple reinforcement components 420 from various directions and angles. The engagement between the reinforcement components 420 and the central component 422 may therefore provide additional support between the support structures 140, and also increases the structural integrity of the building system. It will be appreciated that this arrangement also allows for any number, length and type of vertically, horizontally, or diagonally oriented support structures 140 and/or other building elements to be connected to one another, thus facilitating the modularity and scalability of the building system.

Various forms of the locking assemblies and locking systems described above may have one or more of the following advantages. The interlocking arrangement of the first, second and third components allows the locking assembly to be installed to the support structure of the building system without the use of complex tools or machinery, which may at least reduce the amount of time and labour costs associated with assembling the building system. This interlocking arrangement also allows for the locking assembly to be installed without the use of traditional mechanical fasteners, thus reducing manufacturing costs. The absence of traditional mechanical fasteners may also improve the visual appearance of the building system. As the various components may be formed by extrusion processes, the manufacturing costs may thus be further reduced. Accordingly, the various forms of the locking assemblies and systems described above may provide for a relatively simple and cost-effective way to install a building system that is also aesthetically pleasing. It is also envisaged that the various components of the locking assembly and system may be pre-assembled prior to being transported to a building site, which may further reduce the time and labour costs associated with installing a building system.

Although the invention has been described with reference to a preferred embodiment, it will be appreciated by persons skilled in the art that the invention may be embodied in many other forms.

The invention claimed is:

1. A locking assembly for securing one or more building elements in a building system, the locking assembly comprising:
    a first component configured to engage with a support structure of the building system, the first component including a first locking portion defining a first surface profile;
    a second component including a second locking portion defining a second surface profile corresponding to the first surface profile of the first locking portion, the second locking portion configured to engage with the first locking portion, wherein the second locking portion is resiliently deformable and the second locking portion includes a receiving end at an end of the second component; and
    a third component having a first end and a second end, the first end configured to engage with the receiving end of the second locking portion;
    wherein the third component is resiliently deformable from a locked configuration to an unlocked configuration under application of force to the third component at the second end, wherein in the locked configuration, the third component is engaged between the second component and the support structure so as to provide a watertight seal between the second component and the support structure of the building system, and wherein in the locked configuration, the second locking portion is engaged to the first locking portion so as to secure the first component to the second component, and in the unlocked configuration, the second locking portion is disengaged from the first locking portion.

2. The locking assembly of claim 1, wherein the support structure is a building column.

3. The locking assembly of claim 1, further including a fourth component adapted to be received in a recess of the support structure of the building system and abut the first component so as to frictionally engage and secure the first component to the support structure.

4. The locking assembly of claim 1, wherein the second component is adapted for engagement with the one or more building elements.

5. The locking assembly of claim 1, wherein the second locking portion is adapted for frictional engagement with the first locking portion.

6. The locking assembly of claim 1, wherein the first component includes a pair of the first locking portions adapted for engagement with a respective pair of the second components.

7. The locking assembly of claim 1, wherein the first component is adapted for engagement with the one or more building elements via the second component.

8. The locking assembly of claim 4, wherein in the locked configuration, the third component is engaged between the second component and the first component so as to provide a watertight seal between the second component and the first component.

9. A building system including the locking assembly of claim 1, wherein the building system includes a reinforcement component adapted to be secured to the support structure of the building system for increasing structural integrity of the building system.

10. A locking system for securing a vertical support structure to a horizontal support structure of a building system, the locking system comprising:
    the locking assembly of claim 1; and
    one or more bracket members secured to the vertical support structure;
    one or more collar members adapted to engage the one or more bracket members; and
    one or more connecting members adapted to secure the one or more bracket members and the one or more collar members to the horizontal support structure, thereby securing the vertical support structure to the horizontal support structure.

11. The locking system of claim 10, wherein the one or more bracket members each include a stepped profile adapted to engage a recess of the vertical support structure.

12. The locking system of claim 10, wherein the one or more collar members each include inner protrusions to engage the one or more bracket members.

13. The locking system of claim 10, wherein the one or more connecting members are configured to be in the form of a press-fit stud or pin.

14. The locking system of claim 13, wherein the reinforcement component is elongated and has a cross-shaped cross-section.

15. The locking system of claim 10, further including a reinforcement component adapted to be received within and engage with the vertical or horizontal support structure of the building system.

16. The locking system of claim 15, further including a central component adapted to engage one or more of the reinforcement components so as to secure the vertical support structure to a further vertical support structure.

17. The locking system of claim 16, wherein the central component is adapted to further secure the horizontal support structure to a further horizontal support structure.

* * * * *